(12) United States Patent
Kurimilla et al.

(10) Patent No.: US 8,918,777 B2
(45) Date of Patent: *Dec. 23, 2014

(54) SCHEMA SPECIFICATION TO IMPROVE PRODUCT CONSUMABILITY ON INSTALLATION, CONFIGURATION, AND/OR UN-INSTALLATION ACTIVITY

(71) Applicant: International Business Machines Corporation, Armonk, NY (US)

(72) Inventors: Madhu Kurimilla, Hyderabad (IN); Nooli Vamsi K. Rao, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/800,086

(22) Filed: Mar. 13, 2013

(65) Prior Publication Data

US 2013/0198736 A1    Aug. 1, 2013

Related U.S. Application Data

(63) Continuation of application No. 12/793,493, filed on Jun. 3, 2010, now Pat. No. 8,631,396.

(51) Int. Cl.
*G06F 9/44* (2006.01)
*G06F 9/445* (2006.01)

(52) U.S. Cl.
CPC .. *G06F 8/61* (2013.01); *G06F 8/60* (2013.01); *G06F 8/62* (2013.01)
USPC ........... 717/170; 717/168; 717/169; 717/172; 717/173; 717/174; 717/175; 717/176; 717/177; 717/178

(58) Field of Classification Search
CPC ................ G06F 8/60; G06F 8/61; G06F 8/62
See application file for complete search history.

(56) References Cited

U.S. PATENT DOCUMENTS

| | | | | |
|---|---|---|---|---|
| 5,835,777 | A | * | 11/1998 | Staelin ........................ 717/175 |
| 6,063,134 | A | * | 5/2000 | Peters et al. ................. 717/176 |
| 6,117,187 | A | * | 9/2000 | Staelin ........................ 717/169 |
| 6,698,018 | B1 | * | 2/2004 | Zimniewicz et al. ......... 717/175 |
| 6,993,760 | B2 | * | 1/2006 | Peev et al. .................... 717/174 |
| 7,017,155 | B2 | * | 3/2006 | Peev et al. .................... 717/176 |
| 7,054,901 | B2 | | 5/2006 | Shafer |

(Continued)

OTHER PUBLICATIONS

Bhatia, V. and R. Harold, "InstallShield—Wikipedia, the free encyclopedia", [online], [Retrieved on Jun. 3, 2010]. Retrieved from the Internet at <URL: http://en.wikipedia.org/wiki/InstallShield>, Total 3 pp.

(Continued)

*Primary Examiner* — Henry Tsai
*Assistant Examiner* — Jing-Yih Shyu
(74) *Attorney, Agent, or Firm* — Janaki K. Davda; Konrad, Raynes, Davda & Victor LLP

(57) ABSTRACT

Provided are techniques for retrieving a universal schema specification file that defines a structure of a product specific data set, retrieving the product specific data set that defines a specific configuration for a version of a product, validating the product specific data set using the universal schema specification file, and using the validated product specific data set and a product specific installable to automatically install the version of the product with the specific configuration.

8 Claims, 21 Drawing Sheets

(56) References Cited

U.S. PATENT DOCUMENTS

| | | | |
|---|---|---|---|
| 7,117,195 B2* | 10/2006 | Chantrain et al. | 709/221 |
| 7,246,162 B2 | 7/2007 | Tindal | |
| 7,254,583 B2* | 8/2007 | Cross et al. | 1/1 |
| 7,266,817 B1* | 9/2007 | Barrett | 717/174 |
| 7,289,997 B1* | 10/2007 | Kita et al. | 1/1 |
| 7,624,380 B2* | 11/2009 | Okada | 717/125 |
| 7,657,542 B2* | 2/2010 | Sundararajan et al. | 717/103 |
| 7,827,549 B2* | 11/2010 | Tarassov | 717/174 |
| 7,890,471 B2* | 2/2011 | Fan et al. | 707/673 |
| 8,171,470 B2* | 5/2012 | Goldman et al. | 717/174 |
| 8,185,889 B2* | 5/2012 | Kinder et al. | 717/174 |
| 8,191,060 B2* | 5/2012 | Malasky et al. | 717/175 |
| 8,645,939 B2* | 2/2014 | Felts | 717/169 |
| 2004/0205573 A1* | 10/2004 | Carlson et al. | 715/513 |
| 2005/0055692 A1* | 3/2005 | Lupini et al. | 717/174 |
| 2005/0132358 A1* | 6/2005 | Peev et al. | 717/174 |
| 2005/0138059 A1* | 6/2005 | Cross et al. | 707/102 |
| 2007/0150806 A1* | 6/2007 | Hartmann | 715/523 |
| 2007/0198665 A1 | 8/2007 | De Matteis et al. | |
| 2007/0266038 A1 | 11/2007 | Hegde et al. | |
| 2008/0127169 A1* | 5/2008 | Malasky et al. | 717/174 |
| 2008/0127171 A1* | 5/2008 | Tarassov | 717/174 |
| 2010/0050020 A1* | 2/2010 | Weatherhead | 714/38 |
| 2011/0302570 A1 | 12/2011 | Kurimilla et al. | |

OTHER PUBLICATIONS

Gunderloy, M., "Introducing WiX—O'Reilly Media", [online], Apr. 19, 2004, © 2010, O'Reilly Media, Inc. Retrieved from the Internet at <URL: http://ondotnet.com/pub/a/dotnet/2004/04/19/wix.html>, Total 7 pp.

StackOverflow.com Internet Services, Inc., "Installer Capabilities, WIX vs InstallSheild express.—Stack Overflow", [online], [Retrieved on Jun. 3, 2010]. Retrieved from the Internet at <URL: http://stackoverflow.com/questions/2202210/installer-capabilities-wix-vs-installsheil . . . >, Total 3 pp.

Preliminary Amendment, Mar. 13, 2013, for U.S. Appl. No. 12/793,493, filed Jun. 3, 2010 by M. Kurimilla et al., Total 5 pp. [57.194 (PrelimAmend)].

Adobe Systems Inc., "Adobe Creative Suite 4 Enterprise Manual Deployment Guide", 2008, 18 pp.

Flexara Software, Inc., "InstallAnywhere 2010 User Guide", 2010, 566 pp.

Ketfi, A. and N. Belkhatir, "Model-Driven Framework for Dynamic Deployment and Reconfiguration of Component-Based Software Systems", Proceedings of the Metainformatics Symposium, Nov. 2005, 9 pp.

Microsoft Corporation, "Windows Installer XML (WiX) Toolset", 2005, 392 pp.

Ng, T.H., S.C. Cheung, W.K. Chan, and Y.T. Yu, "Toward Effective Deployment of Design Patterns for Software Extension: A Case Study", Proceedings of the 2006 International Workshop on Software Quality, May 2006, 6 pp.

Notice of Allowance 1 for U.S. Appl. No. 12/793,493, dated Sep. 3, 2013, 12 pp. [57.194 (NOA1)].

Office Action 1 for U.S. Appl. No. 12/793,493, dated Mar. 28, 2013, 24 pp. [57.194 (OA1)].

Response to Office Action 1 for U.S. Appl. No. 12/793,493, dated Jul. 26, 2013, 14 pp. [57.194 (ROA1-1)].

Supplemental Response to Office Action 1 for U.S. Appl. No. 12/793,493, dated Aug. 1, 2013, 7 pp. [57.194 (ROA1-2)].

* cited by examiner

```
1   <?xml version="1.0" encoding="ISO-8859-1"?>
2   <xs:schema xmlns:xs="http://www.w3.org/2001/XMLSchema"
3   targetNamespace="http://www.w3.IBM.com"
4   xmlns="http://www.w3.IBM.com"
5   elementFormDefault="qualified">
6   <xs:element name="Products">
7    <xs:complexType>
8    <xs:sequence>
9     <xs:element name="Product">
10     <xs:complexType>
11     <xs:sequence>
12       <xs:element name="Product_Name" type="xs:string"/>
13        <xs:sequence>
14      <xs:element name="version">
15        <xs:complexType>
16         <xs:sequence>
17           <xs:element name="version_ID" type="xs:string"
18   minOccurs="0" maxOccurs="10"/>
19          <xs:sequence>
20         <xs:element name="OS">
21          <xs:complexType>
22           <xs:sequence>
23            <xs:element name="OS_Name" type="xs:string"
24   minOccurs="0" maxOccurs="10"/>
25             <xs:sequence>
26              <xs:element name="Supported_Hardware" type=
27   "xs:string" minOccurs="0" maxOccurs="10"/>
28              <xs:element name="PreRequisite">
29               <xs:complexType>
30                <xs:sequence>
31                 <xs:element name="InstallType" type="xs:string"
32   minOccurs="0" maxOccurs="10"/>
33                  <xs:sequence>
34                   <xs:element name="ProductName">
35                    <xs:complexType>
36                     <xs:sequence>
```

FIG. 5A

```
37                              <xs:element name="Name" type="xs:string"
38 minOccurs="0" maxOccurs="10"/>
39                              <xs:element name="version">
40                                <xs:complexType>
41                                  <xs:sequence>
42                                    <xs:element name="version_name"
43 type="xs:string" minOccurs="0" maxOccurs="10"/>
44                                      <xs:element name="Preconfig_Settings">
45                                        <xs:complexType>
46                                          <xs:sequence>
47                                            <xs:element name="LocalInstall"
48 type="xs:string" minOccurs="0" maxOccurs="10"/>
49                                            <xs:element name="RemoteInstall"
50 type="xs:string" minOccurs="0" maxOccurs="Unbounded"/>
51                                          </xs:sequence>
52                                        </xs:complexType>
53                                      </xs:element>
54                                    <xs:element name="Postconfig_Settings">
55                                      <xs:complexType>
56                                        <xs:sequence>
57                                          <xs:element name="LocalInstall"
58 type="xs:string" minOccurs="0" maxOccurs="10"/>
59                                          <xs:element name="RemoteInstall"
60 type="xs:string" minOccurs="0" maxOccurs="Unbounded"/>
61                                        </xs:sequence>
62                                      </xs:complexType>
63                                    </xs:element>
64                                    <xs:element name="VerifyInstall_Steps"
65 type="xs:string" minOccurs="0" maxOccurs="10"/>
66                                    <xs:element name="Related_DocumentLinks"
67 type="xs:string" minOccurs="0" maxOccurs="10"/>
68                                  </xs:sequence>
69                                </xs:complexType>
70                              </xs:element>
71                            </xs:sequence>
72                          </xs:complexType>
```

FIG. 5B

```
73                                </xs:element>
74                               </xs:sequence>
75                              </xs:sequence>
76                             </xs:complexType>
77                            </xs:element>
78                            <xs:element name="PreConfigurationSettings">
79                             <xs:complexType>
80                              <xs:sequence>
81                               <xs:element name="LocalInstallation" type=
82   "xs:string" minOccurs="0" maxOccurs="10"/>
83                               <xs:element name="RemoteInstallation" type=
84   "xs:string" minOccurs="0" maxOccurs="10"/>
85                              </xs:sequence>
86                             </xs:complexType>
87                            </xs:element>
88                            <xs:element name="InstallationSteps" type=
89   "xs:string" minOccurs="0" maxOccurs="10"/>
90                            <xs:element name="PostConfigurationSettings">
91                             <xs:complexType>
92                              <xs:sequence>
93                               <xs:element name="LocalInstallation" type=
94   "xs:string" minOccurs="0" maxOccurs="10"/>
95                               <xs:element name="RemoteInstallation" type=
96   "xs:string" minOccurs="0" maxOccurs="10"/>
97                              </xs:sequence>
98                             </xs:complexType>
99                            </xs:element>
100                           <xs:element name="InstallVerificationSteps" type=
101  "xs:string" minOccurs="0" maxOccurs="5"/>
102                           <xs:element name="UninstallationSteps" type=
103  "xs:string" minOccurs="0" maxOccurs="5"/>
104                           <xs:element name="FixPack_Install_Uninstall">
105                            <xs:complexType>
106                             <xs:sequence>
107                              <xs:element name="FixPack_Version">
108                               <xs:complexType>
```

FIG. 5C

```
109                         <xs:sequence>
110                         <xs:element name="FixPack_VersionName"
111  type="xs:string" minOccurs="0" maxOccurs="10"/>
112                         <xs:element name="InstallPatch" type=
113  "xs:string" minOccurs="0" maxOccurs="Unbounded"/>
114                         <xs:element name="UnInstallPatch"
115  type="xs:string" minOccurs="0" maxOccurs="Unbounded"/>
116                         </xs:sequence>
117                         </xs:complexType>
118                         </xs:element>
119                    </xs:sequence>
120                    </xs:complexType>
121                    </xs:element>
122                    <xs:element name="UninstallProduct">
123                    <xs:complexType>
124                    <xs:sequence>
125                    <xs:element name="PreUninstallSteps" type=
126  "xs:string" minOccurs="0" maxOccurs="10"/>
127                    <xs:element name="LocalServer" type="xs:string"
128  minOccurs="0" maxOccurs="10"/>
129                    <xs:element name="RemoteServer" type="xs:string"
130  minOccurs="0" maxOccurs="Unbounded"/>
131                    </xs:sequence>
132                    </xs:complexType>
133                    </xs:element>
134                    <xs:element name="Known_issues_solutions"
135  type="xs:string" minOccurs="0" maxOccurs="10"/>
136                    <xs:element name="Latest_issues_solutions"
137  type="xs:string" minOccurs="0" maxOccurs="10"/>
138                    <xs:element name="LatestInformation" type=
139  "xs:string" minOccurs="0" maxOccurs="10"/>
140                     </xs:sequence>
141                    </xs:sequence>
142                    </xs:complexType>
143                    </xs:element>
144               </xs:sequence>
```

FIG. 5D

```
145            </xs:sequence>
146            </xs:complexType>
147          </xs:element>
148          </xs:sequence>
149        </xs:sequence>
150        </xs:complexType>
151      </xs:element>
152    </xs:sequence>
153    </xs:complexType>
154  </xs:element>
155 </xs:schema>
```

FIG. 5E

```xml
1  <?xml version="1.0" encoding="ISO-8859-1"?>
2  <Products xmlns:xsi="http://www.w3.org/2001/XMLSchema-instance"
3  xmlns="http://www.w3.IBM.com"
4  xsi:schemaLocation="http://www.w3.IBM.com ProductSchema_v1.xsd">
5  <Product>
6  <Product_Name>Application Engine (AE)</Product_Name>
7  <version>
8  <version_ID>4.0</version_ID>
9  <OS>
10 <OS_Name>WINDOWS™ 2003</OS_Name>
11 <Supported_Hardware> Here hardware requirement specified.For
12 Ex:(2GB RAM,20 GB HardDisk,P4 Processer)</Supported_Hardware>
13
14 <PreRequisite>
15 <InstallType>Application server</InstallType>
16
17 <ProductName>
18 <Name>WEBSPHERE™ software</Name>
19 <version>
20
21 <version_name> WAS6.0</version_name>
22 <Preconfig_Settings>
23 <LocalInstall> pre-configuration settings with respect to AE prior to installing
24 WEBSPHERE™ software locally</LocalInstall>
25 <RemoteInstall>pre-configuration settings with respect to AE prior to installing
26 WEBSPHERE™ software remotely</RemoteInstall>
27 </Preconfig_Settings>
28
29 <Postconfig_Settings>
30 <LocalInstall> post-configuration settings with respect to AE after installing
31 WEBSPHERE™ software locally</LocalInstall>
32 <RemoteInstall>post-configuration settings with respect to AE after installing
33 WEBSPHERE™ software remotely</RemoteInstall>
34 </Postconfig_Settings>
35 <VerifyInstall_Steps>Provide Verify steps for Installation or link for documents
36 Ex:(Refer Document 51 to 60 page) </VerifyInstall_Steps>
```

FIG. 6A

```
37  <Related_DocumentLinks>Extra links for this product installation document
38  location
39  </Related_DocumentLinks>
40  </version>
41
42  <version>
43  <version_name> WAS5.0</version_name>
44  <Preconfig_Settings>
45  <LocalInstall> pre-configuration settings with respect to AE prior to installing
46  WEBSPHERE™ software locally</LocalInstall>
47  <RemoteInstall>pre-configuration settings with respect to AE prior to installing
48  WEBSPHERE™ software remotely</RemoteInstall>
49  </Preconfig_Settings>
50
51  <Postconfig_Settings>
52  <LocalInstall> post-configuration settings with respect to AE after installing
53  WEBSPHERE™ software locally</LocalInstall>
54  <RemoteInstall>post-configuration settings with respect to AE after installing
55  WEBSPHERE™ software remotely</RemoteInstall>
56  </Postconfig_Settings>
57  <VerifyInstall_Steps>Provide Verify steps for Installation or link for documents
58  Ex:(Refer Document 51 to 60 page) </VerifyInstall_Steps>
59  <Related_DocumentLinks>Extra links for this product installation document
60  location
61  </Related_DocumentLinks>
62  </version>
63
64  </ProductName>
65
66  <ProductName>
67  <Name>WebLogic</Name>
68  <version>
69
70  <version_name> WebLogic6.0</version_name>
71  <Preconfig_Settings>
72  <LocalInstall> pre-configuration settings with respect to AE prior to installing
```

```
73   WebLogic locally</LocalInstall>
74   <RemoteInstall>pre-configuration settings with respect to AE prior to installing
75   WebLogic remotely</RemoteInstall>
76   </Preconfig_Settings>
77
78   <Postconfig_Settings>
79   <LocalInstall> post-configuration settings with respect to AE after installing
80   WebLogic locally</LocalInstall>
81   <RemoteInstall>post-configuration settings with respect to AE after installing
82   WebLogic remotely</RemoteInstall>
83   </Postconfig_Settings>
84   <VerifyInstall_Steps>Provide Verify steps for Installation or link for documents
85   Ex:(Refer Document 51 to 60 page) </VerifyInstall_Steps>
86   <Related_DocumentLinks>Extra links for this product installation document
87   location
88   </Related_DocumentLinks>
89   </version>
90
91   <version>
92   <version_name> WebLogic5.0</version_name>
93   <Preconfig_Settings>
94   <LocalInstall> pre-configuration settings with respect to AE prior to installing
95   WebLogic locally</LocalInstall>
96   <RemoteInstall>pre-configuration settings with respect to AE prior to installing
97   WebLogic remotely</RemoteInstall>
98   </Preconfig_Settings>
99
100  <Postconfig_Settings>
101  <LocalInstall> post-configuration settings with respect to AE after installing
102  WebLogic locally</LocalInstall>
103  <RemoteInstall>post-configuration settings with respect to AE after installing
104  WebLogic remotely</RemoteInstall>
105  </Postconfig_Settings>
106  <VerifyInstall_Steps>Provide Verify steps for Installation or link for documents
107  Ex:(Refer Document 51 to 60 page) </VerifyInstall_Steps>
108  <Related_DocumentLinks>Extra links for this product installation document
```

FIG. 6C

```
109  location
110  </Related_DocumentLinks>
111  </version>
112
113  </ProductName>
114
115  <PreRequisite>
116  <InstallType>DataBase</InstallType>
117
118  <ProductName>
119  <Name>SqlServer</Name>
120
121  <version>
122  <version_name> SqlServer2000</version_name>
123
124  <Preconfig_Settings>
125  <LocalInstall> pre-configuration settings with respect to AE prior to
126  installing SQL
127  Server 2000 locally</LocalInstall>
128  <RemoteInstall>pre-configuration settings with respect to AE prior to
129  installing SQL
130  Server 2000 remotely</RemoteInstall>
131  </Preconfig_Settings>
132
133  <Postconfig_Settings>
134  <LocalInstall> post-configuration settings with respect to AE after installing
135  SQL Server 2000 locally</LocalInstall>
136  <RemoteInstall>post-configuration settings with respect to AE after
137  installing SQL
138  Server 2000 remotely</RemoteInstall>
139  </Postconfig_Settings>
140
141  <VerifyInstall_Steps>Provide Verify steps for Installation or link for documents
142  Ex:(Refer Document 51 to 60 page) </VerifyInstall_Steps>
143  <Related_DocumentLinks>Extra links for this product installation document
144  location
```

FIG. 6D

```
145  </Related_DocumentLinks>
146  </version>
147
148  <version>
149  <version_name> SqlServer2005</version_name>
150  <Preconfig_Settings>
151  <LocalInstall> pre-configuration settings with respect to AE prior to installing SQL
152  Server 2005 locally</LocalInstall>
153  <RemoteInstall>pre-configuration settings with respect to AE prior to installing SQL
154  Server 2005 remotely</RemoteInstall>
155  </Preconfig_Settings>
156
157  <Postconfig_Settings>
158  <LocalInstall> post-configuration settings with respect to AE after installing SQL
159  Server
160  2005 locally</LocalInstall>
161  <RemoteInstall>post-configuration settings with respect to AE after installing SQL
162  Server 2005 remotely</RemoteInstall>
163  </Postconfig_Settings>
164
165  <VerifyInstall_Steps>Provide Verify steps for Installation or link for documents
166  Ex:(Refer Document 51 to 60 page) </VerifyInstall_Steps>
167  <Related_DocumentLinks>Extra links for this product installation document
168  location
169  </Related_DocumentLinks>
170  </version>
171
172  </ProductName>
173
174  <ProductName>
175  <Name>DB2™</Name>
176
177  <version>
178  <version_name> DB2™ 2000 </version_name>
179  <Preconfig_Settings>
180  <LocalInstall> pre-configuration settings with respect to AE prior to installing
```

FIG. 6E

```
181  DB2™ locally</LocalInstall>
182  <RemoteInstall>pre-configuration settings with respect to AE prior to installing
183  DB2™ remotely</RemoteInstall>
184  </Preconfig_Settings>
185  <Postconfig_Settings>
186  <LocalInstall> post-configuration settings with respect to AE after installing
187  DB2™ locally</LocalInstall>
188  <RemoteInstall>post-configuration settings with respect to AE after installing
189  DB2™ remotely</RemoteInstall>
190  </Postconfig_Settings>
191
192  <VerifyInstall_Steps>Provide Verify steps for Installation or link for documents
193  Ex:(Refer Document 51 to 60 page) </VerifyInstall_Steps>
194  <Related_DocumentLinks>Extra links for this product installation document
195  location
196  </Related_DocumentLinks>
197  </version>
198
199  <version>
200  <version_name> DB2™ 2005</version_name>
201  <Preconfig_Settings>
202  <LocalInstall> pre-configuration settings with respect to AE prior to installing
203  DB2™ locally</LocalInstall>
204  <RemoteInstall>pre-configuration settings with respect to AE prior to installing
205  DB2™ remotely</RemoteInstall>
206  </Preconfig_Settings>
207
208  <Postconfig_Settings>
209  <LocalInstall> post-configuration settings with respect to AE after installing
210  DB2™ locally</LocalInstall>
211  <RemoteInstall>post-configuration settings with respect to AE after installing
212  DB2™ remotely</RemoteInstall>
213  </Postconfig_Settings>
214  <VerifyInstall_Steps>Provide Verify steps for Installation or link for documents
215  Ex:(Refer Document 51 to 60 page) </VerifyInstall_Steps>
216  <Related_DocumentLinks>Extra links for this product installation document
```

FIG. 6F

```
217  location
218  </Related_DocumentLinks>
219  </version>
220
221  </ProductName>
222
223  </PreRequisite>
224
225  <PreRequisite>
226
227  <InstallType>Application</InstallType>
228  <ProductName>
229  <Name>Content Engine</Name>
230
231  <version>
232  <version_name> CE4.0</version_name>
233
234  <Preconfig_Settings>
235  <LocalInstall> pre-configuration settings with respect to AE prior to installing CE
236  locally</LocalInstall>
237  <RemoteInstall>pre-configuration settings with respect to AE prior to installing CE
238  remotely</RemoteInstall>
239  </Preconfig_Settings>
240
241  <Postconfig_Settings>
242  <LocalInstall> post-configuration settings with respect to AE after installing CE
243  locally</LocalInstall>
244  <RemoteInstall>post-configuration settings with respect to AE after installing CE
245  remotely</RemoteInstall>
246  </Postconfig_Settings>
247
248  <VerifyInstall_Steps>Provide Verify steps for Installation or link for documents
249  Ex:(Refer Document 51 to 60 page) </VerifyInstall_Steps>
250  <Related_DocumentLinks>Extra links for this product installation document
251  location
252  </Related_DocumentLinks>
```

FIG. 6G

```
253  </version>
254
255  <version>
256  <version_name> CE3.5</version_name>
257
258  <Preconfig_Settings>
259  <LocalInstall> pre-configuration settings with respect to AE prior to installing CE
260  locally</LocalInstall>
261  <RemoteInstall>pre-configuration settings with respect to AE prior to installing CE
262  remotely</RemoteInstall>
263  </Preconfig_Settings>
264
265  <Postconfig_Settings>
266  <LocalInstall> post-configuration settings with respect to AE after installing CE
267  locally</LocalInstall>
268  <RemoteInstall>post-configuration settings with respect to AE after installing CE
269  remotely</RemoteInstall>
270  </Postconfig_Settings>
271  <VerifyInstall_Steps>Provide Verify steps for Installation or link for documents
272  Ex:(Refer Document 51 to 60 page) </VerifyInstall_Steps>
273  <Related_DocumentLinks>Extra links for this product installation document
274  location
275  </Related_DocumentLinks>
276  </version>
277
278  </ProductName>
279  </PreRequisite>
280
281  <PreRequisite>
282
283  <InstallType>BPM Application</InstallType>
284  <ProductName>
285  <Name>Process Engine</Name>
286
287  <version>
```

```
288  <version_name> PE4.0</version_name>
289  <Preconfig_Settings>
290  <LocalInstall> pre-configuration settings with respect to AE prior to installing PE
291  locally</LocalInstall>
292  <RemoteInstall>pre-configuration settings with respect to AE prior to installing PE
293  remotely</RemoteInstall>
294  </Preconfig_Settings>
295
296  <Postconfig_Settings>
297  <LocalInstall> post-configuration settings with respect to AE after installing PE
298  locally</LocalInstall>
299  <RemoteInstall>post-configuration settings with respect to AE after installing PE
300  remotely</RemoteInstall>
301  </Postconfig_Settings>
302
303  <VerifyInstall_Steps>Provide Verify steps for Installation or link for documents
304  Ex:(Refer Document 51 to 60 page) </VerifyInstall_Steps>
305  <Related_DocumentLinks>Extra links for this product installation document
306  location
307  </Related_DocumentLinks>
308  </version>
309
310  <version>
311  <version_name> PE3.5</version_name>
312
313  <Preconfig_Settings>
314  <LocalInstall> pre-configuration settings with respect to AE prior to installing PE
315  locally</LocalInstall>
316  <RemoteInstall>pre-configuration settings with respect to AE prior to installing PE
317  remotely</RemoteInstall>
318  </Preconfig_Settings>
319
320  <Postconfig_Settings>
321  <LocalInstall> post-configuration settings with respect to AE after installing PE
322  locally</LocalInstall>
323  <RemoteInstall>post-configuration settings with respect to AE after installing PE
```

FIG. 6I

```
324  remotely</RemoteInstall>
325  </Postconfig_Settings>
326
327  <VerifyInstall_Steps>Provide Verify steps for Installation or link for documents
328  Ex:(Refer Document 51 to 60 page) </VerifyInstall_Steps>
329  <Related_DocumentLinks>Extra links for this product installation document
330  location
331  </Related_DocumentLinks>
332  </version>
333
334  </ProductName>
335  </PreRequisite>
336
337  <PreConfigurationSettings>
338  <LocalInstallation>  Pre configuration settings prior to AE installation when it is
339  installed locally </LocalInstallation>
340  <RemoteInstallation> Pre configuration settings prior to AE installation when it is
341  installed remotely </RemoteInstallation>
342  </PreConfigurationSettings>
343
344  <InstallationSteps>Will have brief information about AE installation in the form of
345  check points and provide links for detailed information of installation for each check
346  point </InstallationSteps>
347
348  <PostConfigurationSettings>
349  <LocalInstallation>  Post configuration settings after installing AE locally
350  </LocalInstallation>
351  <RemoteInstallation> Post configuration settings after installing AE remotely
352  </RemoteInstallation>
353  </PostConfigurationSettings>
354
355  <InstallVerificationSteps>Verify Installation by giving steps or refer document links
356  Ex:(Refer page num 65) </InstallVerificationSteps>
357
358  <UnInstallationSteps> Procedure to Uninstall with dependency in sequence for
359  safe removal </UnInstallationSteps>
```

FIG. 6J

```
360  <FixPack_Install_Uninstall>
361  <FixPack_Version>
362  <FixPack_VersionName>20,25</FixPack_VersionName>
363  <InstallPatch> Steps to install </InstallPatch>
364  <UninstallPatch> Steps to rollback fixpack installation </UninstallPatch>
365  </FixPack_Version>
366  <FixPack_Version>
367  <FixPack_VersionName>35,38</FixPack_VersionName>
368  <InstallPatch> Steps to install </InstallPatch>
369  <UninstallPatch> Steps to rollback fixpack installation </UninstallPatch>
370  </FixPack_Version>
371  </FixPack_Install_Uninstall>
372
373  <UninstallProduct>
374  <PreUninstallSteps> Steps to be ensured before uninstalling the product, like
375  stopping the services, uninstalling any dependent products in sequence prior to
376  uninstalling actual product </PreUninstallSteps>
377  <LocalServer> Steps to uninstall on the Local Server </LocalServer>
378  <RemoteServer> Steps to uninstall the product from remote
379  server</RemoteServer>
380  </UninstallProduct>
381
382  <Known_issues_solutions>provide link to trouble shooting guide or any other
383  documents</Known_issues_solutions>
384
385  <Latest_issues_solutions>Latest Installation/configuration issues encountered
386  which has been not documented anywhere </Latest_issues_solutions>
387
388  <LatestInformation>Refer website link for more information
389  </LatestInformation>
390
391  </OS>
392  </version>
393  </Product>
394  </Products>
```

SCHEMA SPECIFICATION TO IMPROVE PRODUCT CONSUMABILITY ON INSTALLATION, CONFIGURATION, AND/OR UN-INSTALLATION ACTIVITY

CROSS-REFERENCE TO RELATED APPLICATION

This patent application is a continuation of U.S. patent application Ser. No. 12/793,493, filed Jun. 3, 2010, which patent application is incorporated herein by reference in its entirety.

BACKGROUND

1. Field

Embodiments of the invention relate to a schema specification to improve product consumability on installation, configuration, and/or un-installation activity.

2. Description of the Related Art

With conventional techniques, installation, configuration, and/or un-installation of a specific product version (also referred to as a version of a product) is time consuming and error prone.

Unfortunately, an end user (e.g., a customer) may go through installation, configuration, and/or un-installation documents for an entire product (e.g., all versions of that product) even though the end user requires only specific installation steps for the specific product version to be installed on one of multiple supported operating systems.

Installation documents (e.g., installation guides) are often too cumbersome to understand. Thus, end users often miss the sequence of installation, ensuring pre-requisites, checking hardware requirements, pre-installation and post-installation steps, etc. Finally, the end user may end up with installation failure, even after spending a large amount of time on installation, and it is very difficult for the end user to trace the root cause of the installation failure.

This kind of installation failure makes the end users disappointed with products, and the end users are not likely to purchase the products that are not consumable (e.g., not easy to use) on installation, configuration, and/or un-installation criteria.

End users are typically unaware of the latest installation issues and solutions (i.e., resolutions) for these installation issues. Hence, the end users typically need to contact the product support team (i.e., end user service) for the solutions. It is very difficult to provide the latest information about installation issues and solutions in installation documents or in any other documents. It is also difficult to maintain these documents.

End users also face difficulty in figuring out what pre-requisite software and/or hardware is compatible with a particular product version that the end users are planning to install.

If the specific installation, configuration, and/or un-installation information is not known to the end users, then it is more likely that the installation will fail, which in turn reduce the end users wanting to purchase the products, and this leads to a reduction in company revenue.

Thus, there is a need for a schema specification to improve product consumability on installation, configuration, and/or un-installation activity.

BRIEF SUMMARY

Provided are a method, computer program product, and system for retrieving a universal schema specification file that defines a structure of a product specific data set, retrieving the product specific data set that defines a specific configuration for a version of a product, validating the product specific data set using the universal schema specification file, and using the validated product specific data set and a product specific installable to automatically install the version of the product with the specific configuration.

BRIEF DESCRIPTION OF THE SEVERAL VIEWS OF THE DRAWINGS

Referring now to the drawings in which like reference numbers represent corresponding parts throughout:

FIG. 5 illustrates a sample universal schema specification file in accordance with certain embodiments. FIG. 5 is formed by FIGS. 5A, 5B, 5C, 5D, and 5E.

FIG. 6 illustrates a portion of a sample product specific data set in accordance with certain embodiments. FIG. 6 is formed by FIGS. 6A, 6B, 6C, 6D, 6E, 6F, 6G, 6H, 6I, 6J, and 6K.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments provide a universal schema specification file and product specific data sets. With embodiments, an installer uses a parser to validate the product specific data set against the universal schema specification file and makes use of the product specific data set to install, configure, and/or un-install a version of a product automatically (i.e., with minimal or zero user intervention). Also, a product specific installable is used to automatically install the version of the product version with minimal or zero user intervention. A product specific installable may be described as code (e.g., *.exe or *.rpm file) for the product.

Also, with embodiments, the product specific data set may be used to generate a product specific document, which is specific to version of the product with specific configurations, so that the end user can 1) install the product manually, bypassing automatic installation or 2) understand what exactly is happened during automatic installation.

In any case, a parser is used to validate the product specific data set against the universal schema specification file prior to generating the product specific document. In certain embodiments, a product referred to herein is a software product.

Figure 1:
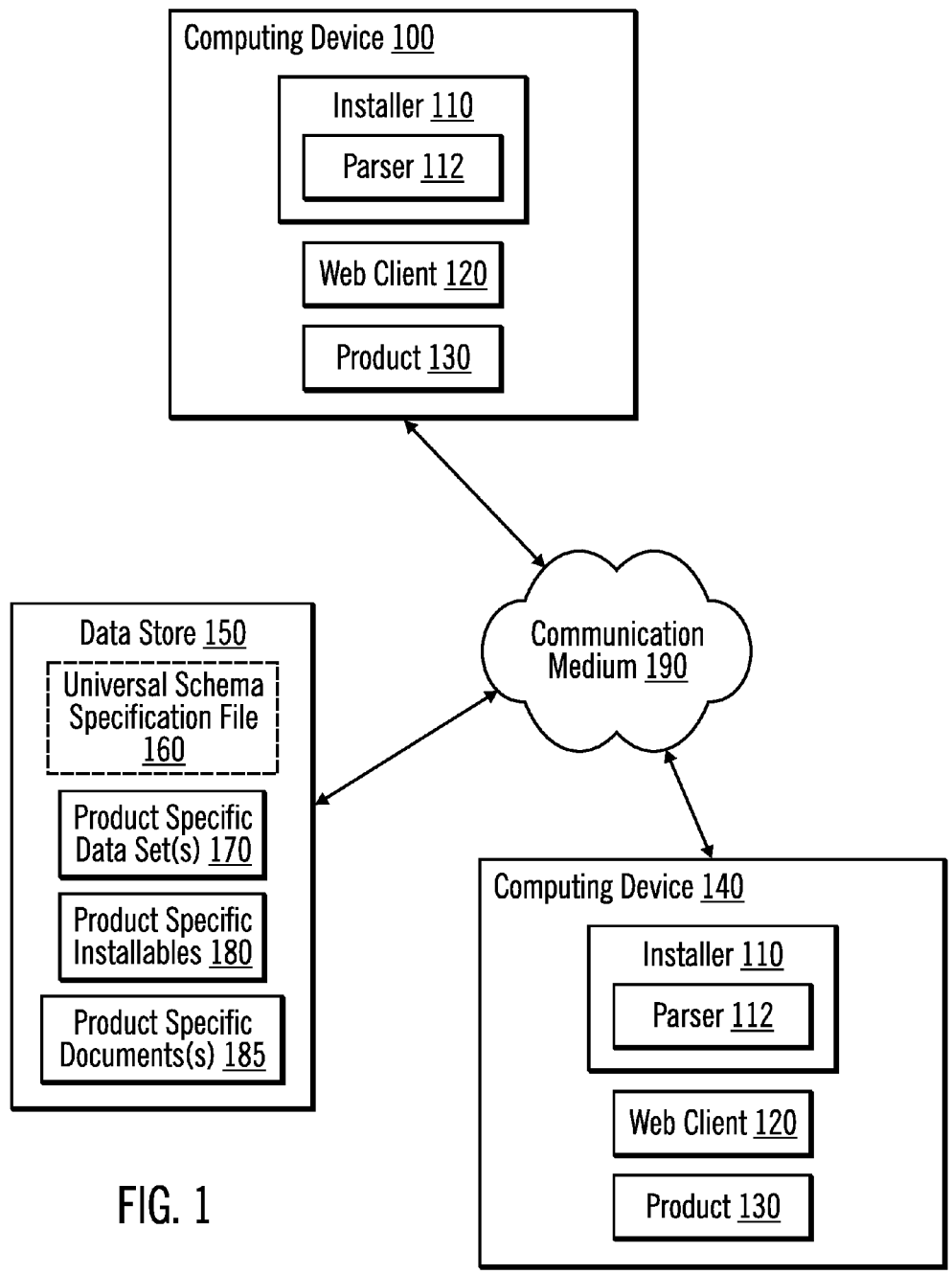
FIG. 1 illustrates a system architecture in accordance with certain embodiments.

FIG. 1 illustrates a system architecture in accordance with certain embodiments. A computing device 100, a data store 150, and a computing device 140 are coupled to each other via a communication medium 190.

Each computing device 100, 140 includes an installer 110, a Web client 120, and a product 130. The term "Web" is used herein to refer to the World Wide Web. The installer 110 includes a parser 112. In certain embodiments, the installer 110 has the parser 112 internally validate the product specific data set 170 against the universal schema specification file 160. In certain embodiments, the installer 110 makes use of the parser 112 during installation, configuration, and un-installation operations of versions of products automatically. The computing device 100, 140 uses the Web client 120 for local and/or remote installation, configuration, and/or un-installation. For example, the computing device 100, 140 may use the Web client 120 to install, configure, and/or un-install a version of a product 130 on computing device 100, 140. Local installation, configuration, and/or un-installation is done by a computing device 100, 140 at that computing device 100, 140. Remote installation, configuration, and/or un-installation is done by one computing device 100, 140 at the other computing device 100, 140.

In certain alternative embodiments, the data store 150 may be directly coupled to the computing device 100, 140 instead of being coupled via the communication medium 190. The data store 150 is a repository for storing a universal schema specification file 160, one or more product specific data sets 170, one or more product specific installables 180, and one or more product specific documents 185. The computing devices 100, 140 are linked to the data store 150 to enable the computer device 100, 140 to install the version of the product 130 locally, without using a Web client.

In certain embodiments, the parser 112 is an eXtensible Markup Language (XML) parser, which is part of the installer 110. The installer 110 installs the specified version of the product 130 by making use of the product specific data sets 170 automatically with minimal or zero user intervention.

In certain embodiments, a product developer creates (e.g., writes) the parser 112 to get the information specific to the installation by making use of the product specific data set 170. In certain embodiments, a document writer may customize the parser 112 to generate product specific documents 185. The parser validates the product specific data set 170 against the universal schema specification file 160 and outputs the product specific document 185. The product specific document 185 is created for end users for manual installation or to understand the installation procedure carried out by the installer 110 automatically for a specific version of the product 130 with a specific configuration. In certain embodiments, the product specific document 185 is a Portable Document Format (PDF) document. In certain embodiments, the product specific document 185 is a HyperText Markup Language (HTML) document.

In certain embodiments, the universal schema specification file 160 is in XML format. In certain embodiments, the universal schema specification file 160 is used to set the standards for installation of versions of the product and configuration by providing a blueprint of how flows should take place and what help can be given at which stage of installation. The universal schema specification file 160 enables successful installation, configuration, and/or un-installation of a version of the product at each stage of processing, with minimal or no (i.e., zero) help and/or support from a product support team. The universal schema specification file 160 defines how the product specific data set 170 should describe pre-requisites for installation, configuration and/or un-installation, pre-installation and post-installation configuration specific to a platform and version based on dependent software, installation steps, checklists for installation, configuration, and/or un-installation.

Typically, installation documents are scattered in different locations and different files. For example, a product 130 may store the installation document as a Portable Document Format (PDF) document, store a compatibility matrix in another location, store hardware and/or software requirements in another document, store trouble shooting information in another document, etc. However, use of the universal schema specification file 160 with a product specific data set 170 results in the product specific document 185, which may be described as storing the installation and other (e.g., configuration and un-installation) documents into one common location. In addition, product specific data set 170 enables the installer 110 to understand pre/post installation, configuration, and un-installation requirements, which will enable the installer 100 to install the version of the product 130 automatically, with minimal or zero user intervention. Thus, in certain embodiments, the installer 110 can install, configure, and/or un-install the version of the product 130 automatically by making use of the product specific data set 170.

By using the universal schema specification file 160, embodiments provide solutions/workarounds on the latest issues reported on installation, configuration and/or un-installation, which may not be documented elsewhere. In certain embodiments, the solutions/workarounds on the latest issues may be updated in the product specific data set 170 under a "Latest Issues" tag. For example, a development team may track the known/latest issues with workaround/solutions and update the product specific data set 170 regularly to keep the end user in sync with such information.

In certain embodiments, each product 130 has an associated product specific data set 170. In certain embodiments, the product specific data set 170 is an XML file that follows the schema specifications defined in the universal schema specifications file 160. In certain embodiments, a developer creates the product specific data set 170 as per the universal schema specification file 160.

The generated product specific data set 170 includes the details of supported versions, the pre-requisite software and hardware needed by the supported versions, the sequence of installation (e.g., for the pre-requisite software and/or hardware), the pre-installation configuration, the post-installation configuration, the installation verification steps, the known installation issues and solutions, the latest installation issues and solutions, etc. Thus, the product specific data set may be described as a quick, accurate, and up to date installation, configuration, and/or un-installation document. The product specific data set 170 may be described as encapsulating details of installation, configuration, and un-installation of a version of a product.

The computing device 140 includes a product 130 that is to be installed, configured and/or un-installed. In certain embodiments, the product 130 is a software product.

In certain embodiments, the universal schema specification file 160 may be maintained with minimal knowledge by, for example, a developer, and the product specific data set 170 may be created with minimal effort.

Figure 2:
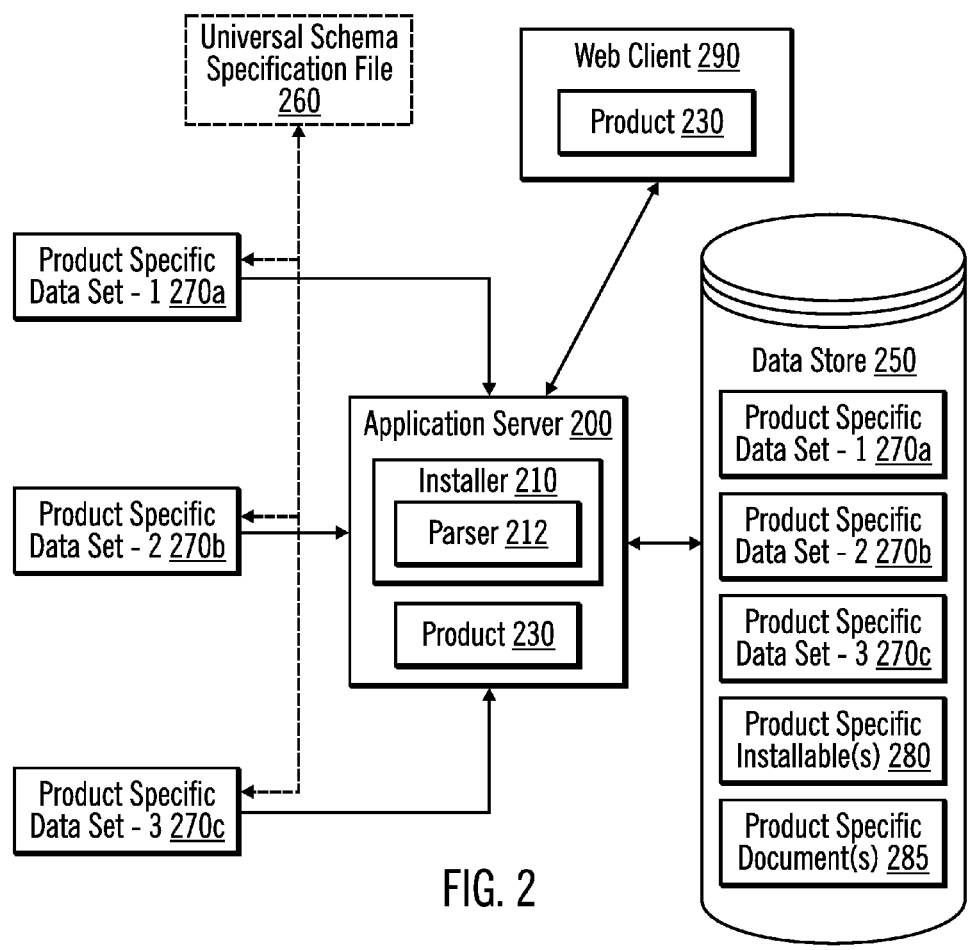
FIG. 2 illustrates a system architecture in accordance with certain alternative embodiments.

FIG. 2 illustrates a system architecture in accordance with certain alternative embodiments. In the example of FIG. 2, there are three product specific data sets 270a, 270b, and 270c and there is the one universal schema specification file 260. In FIG. 2, the parser 212 retrieves the universal schema specification file and a product specific data set 270a, 270b or 270c and outputs a product specific document 285. An application server 200 includes an installer 210, which includes a parser 212, for local and/or remote installation, configuration, and/or un-installation of a version of a product 230. The application server 200 uses the parser 212 to validate the product specific data sets 270a, 270b, 270c against the universal schema specification file 260 and stores the data sets 270a, 270b, 270c in the data store 250. In certain embodiments, the parser 212 may run in the background continuously. The application server 200 installs the specific version of the product by pulling the product specific installables 280 and product specific data sets 270a, 270b, 270c from the data store 250 onto a specified remote machine with the help of the installer 210.

The web client 290 may be used for local and/or remote installation. In certain embodiments, the web client 290 requests the application server 200 to install, configure, and/or un-install a version of the product 230 on a remote machine by making use of the installer 210. The web client 290 is used as a medium to request the application server 200 to automatically install the specific version of the product 230, without using the product specific document 285 for installation. The application server 200 retrieves the files (e.g., one or more product specific data sets 270a, 270b, 270c, one or more product specific installables 280, etc.) from the data store 250 to fulfill the web client 290 request. In certain embodiments, the application server 200 and the data store 250 are co-located. In certain embodiments, the web client 290 is a web page that provides a form to fill in the details of installation for a specific version of the product 230 or a JAVA™ applet.

In certain embodiments, the product specific document 285 is used for manual installation, and manual installation is carried out if the installer 210 does not support automatic installation due to unknown constraints. The installer 210 is able to handle automatic installation using the one or more product specific data sets 270a, 270b, 270c.

Figure 3:
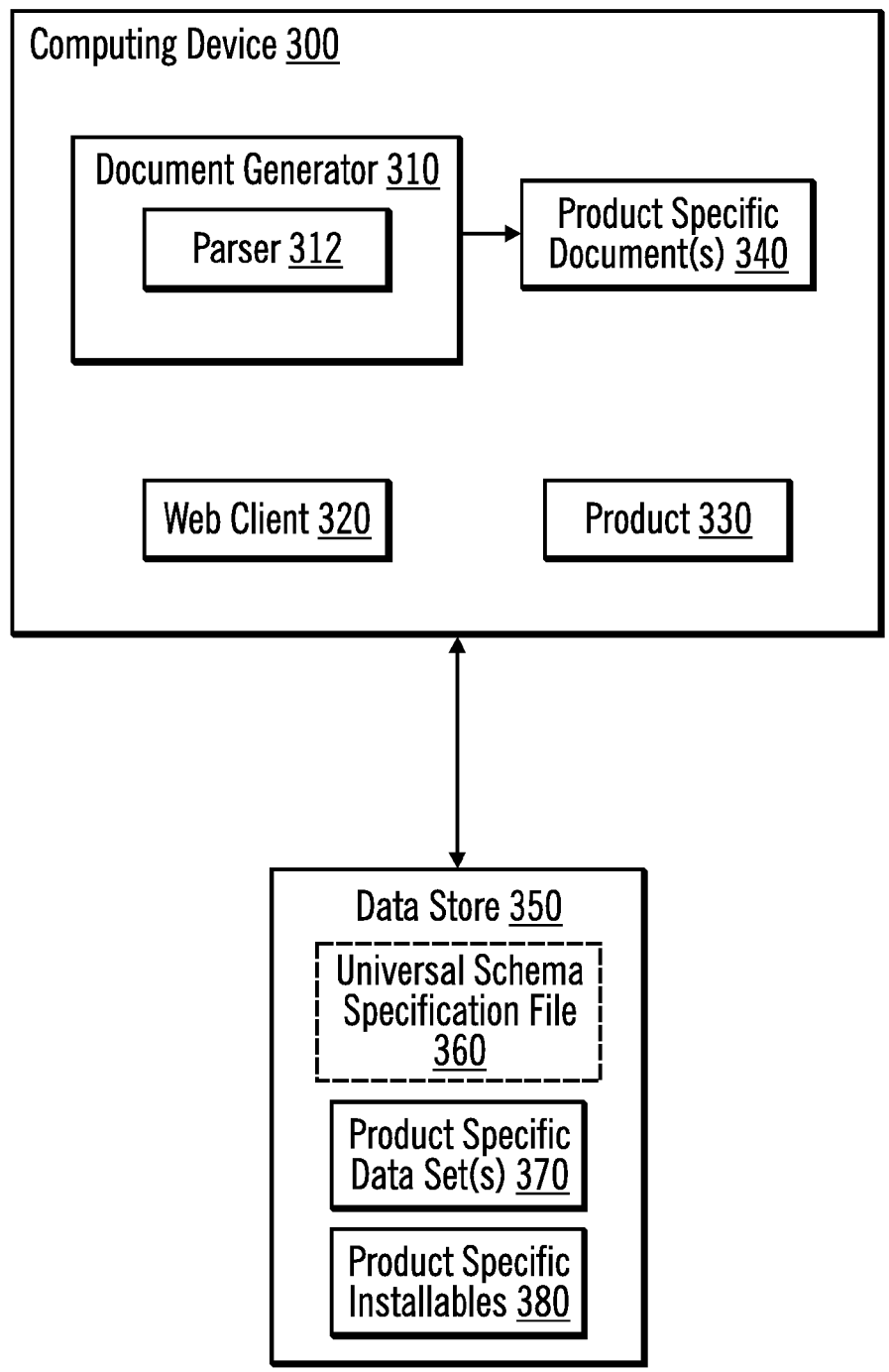
FIG. 3 illustrates a system architecture in accordance with yet other alternative embodiments.

FIG. 3 illustrates a system architecture in accordance with yet other alternative embodiments. A computing device 300 is coupled to a data store 350. The computing device 300 includes a document generator 310, a Web client 320, and a product 330. The document generator 310 includes a parser 312. The document generator 310 generates one or more product specific documents 340. The data store 350 is a repository for storing a universal schema specification file 360, one or more product specific data sets 370, and one or more product specific installables 380. In certain embodiments, the product specific documents 340 are in PDF format or HTML format. For example, a product specific document 340 may be an installation document in PDF or HTML format for a specific product configuration. The product specific documents 340 may be generated locally or via the Web client 320. In certain embodiments, the product specific documents 340 are generated regularly (e.g., daily) to keep end users in sync with the latest updates.

Figure 4:
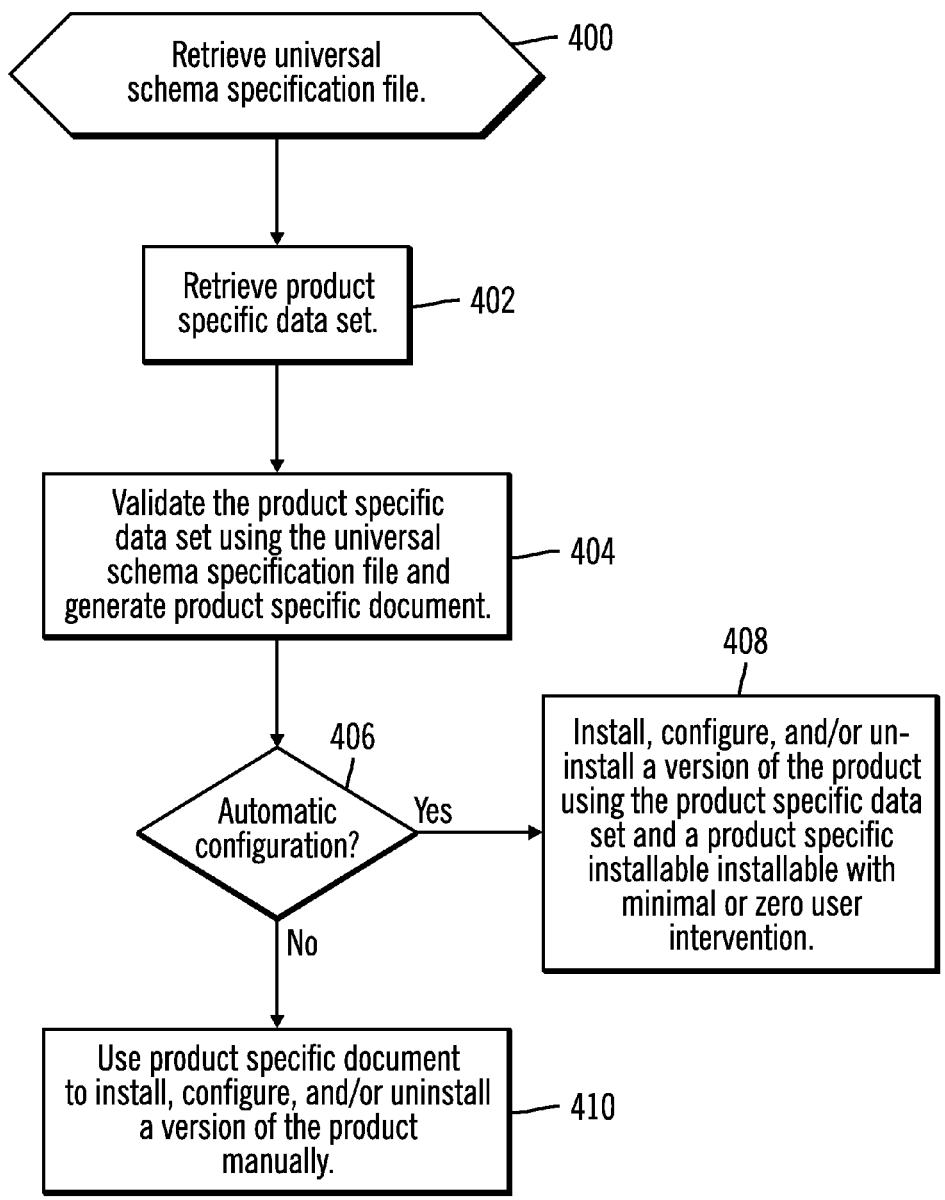
FIG. 4 illustrates logic for creating product documents in accordance with certain embodiments.

FIG. 4 illustrates logic for creating the product specific document 185 in accordance with certain embodiments. Control begins in block 400 with the parser 112 retrieving the universal schema specification file 160. FIG. 5 illustrates a sample universal schema specification file 500, 510, 520, 530, 540 in accordance with certain embodiments. FIG. 5 is formed by FIGS. 5A, 5B, 5C, 5D, and 5E. The line numbers in FIGS. 5A, 5B, 5C, 5D, and 5E illustrate the order of the items and will be used for reference herein.

For example, in FIG. 5, the universal schema specification file 500, 510, 520, 530, 540 includes a schema name (line number 2) and indicates that products (line number 6) are to be defined. The universal schema specification file 500, 510, 520, 530, 540 defines the following information for a product (line number 9): a product name (line number 12), a version identifier (line number 17), an Operating System (OS) name (line number 23), supported hardware (line number 26), a pre-requisite (line number 28) (although any number of pre-requisites may be defined in a product specific data set 170), pre-configuration settings (line number 78) for a local installation (line number 81) and a remote installation (line number 83) with installation steps (line number 88), post-configuration settings (line number 90) for a local installation (line number 93) and a remote installation (line number 95), installation verification steps (line number 100), un-installation steps (line number 102), fix pack install and un-install steps (line number 104), an un-install product (line number 122), known issues and solutions (line number 134), latest issues and solutions (line number 136), and latest information (line number 138).

For each pre-requisite (line number 28), the universal schema specification file 500, 510, 520, 530, 540 defines an install type (line number 31), and a product name (line number 34). For the pre-requisite product name (line number 34), the universal schema specification file 500, 510, 520, 530, 540 defines a version name (line number 42), pre-configuration settings (line number 44) for a local installation (line number 47) and a remote installation (line number 49), post-configuration settings (line number 54) for a local installation (line number 57) and a remote installation (line number 59), verify install steps (line number 64), and related document links (line number 66).

For each fix pack (line number 104), the universal schema specification file 500, 510, 520, 530, 540 defines a fix pack version name (line number 110), an install patch (line number 112), and an un-install patch (line number 114).

For each un-install product (line number 122), the universal schema specification file 500, 510, 520, 530, 540 defines pre-un-install steps (line number 125), a local server type (line number 127), and a remote server type (line number 129).

In block 402, the parser 112 retrieves a product specific data set 170. In certain embodiments, the parser 112 receives selection of a particular product specific data set 170 from an end user. FIG. 6 illustrates a portion of a sample product specific data set 600, 610, 620, 630, 640, 650, 660, 670, 680, 685, 690 in accordance with certain embodiments. FIG. 6 is formed by FIGS. 6A, 6B, 6C, 6D, 6E, 6F, 6G, 6H, 6I, 6J, and 6K. The line numbers in FIGS. 6A, 6B, 6C, 6D, 6E, 6F, 6G, 6H, 6I, 6J, and 6K illustrate the order of the items and will be used for reference herein.

In FIG. 6, the product specific data set 600, 610, 620, 630, 640, 650, 660, 670, 680, 685, 690 references the name of the universal schema specification file 500, 510, 520, 530, 540 (FIG. 5) at line number 2 (FIG. 6A). The product specific data set 600, 610, 620, 630, 640, 650, 660, 670, 680, 685, 690 describes an Application Engine product (line number 6), version 4.0 (line number 8) with a WINDOWS™ 2003 operating system. WINDOWS is a registered trademark or common law mark of Microsoft Corporation in the United States and/or other countries.

Examples of hardware requirements include identifying 2 Gigabytes (2 GB) of Random Access Memory (RAM), 20 GB hard disk, and a P4 processor. The pre-requisites include an Application Server (starting at line number 15), a database (starting at line number 116), a content engine (starting at line number 229), and a process engine (starting at line number 285). Following the definition of the pre-requisites, the product specific data set 600, 610, 620, 630, 640, 650, 660, 670, 680, 685, 690 describes pre-configuration settings for a local installation and a remote installation (line numbers 337-342) with installation steps (line numbers 344-346), post-configuration settings for a local installation and a remote installation (line numbers 348-353), installation verification steps (line numbers 355-356), un-installation steps (line numbers 358-359), fix pack install and un-install steps (line numbers 360-371), an un-install product (line numbers 373-380), known issues and solutions (line numbers 382-383), latest issues and solutions (line numbers 385-386), and latest information (line number 388-389).

Merely to enhance understanding, further details of the pre-requisite of an Application Server (line number 15) will be discussed. The Application Server (line number 15) has the product name WEBSPHERE™ software (line number 18), having version 6.0 (line number 21). WEBSPHERE is a registered trademark or common law mark of International Business Machines (IBM) Corporation in the United States and/or other countries. The product specific data set 600, 610, 620, 630, 640, 650, 660, 670, 680, 685, 690 describes pre-configuration settings (line numbers 22-27), post-configuration settings (line numbers 29-34), verify install steps (line number 35), related document links (line number 37). The product specific data set 600, 610, 620, 630, 640, 650, 660, 670, 680, 685, 690 also describes version 5.0 of the WEBSPHERE™ software (starting at line 43).

The products that are described as pre-requisites in the product specific data set may be from different vendors (e.g., International Business Machines Corporation and other companies).

In block 404, the parser 112 validates the product specific data set 170 using the universal schema specification file 160 and generates the product specific document 185. In certain embodiments, if the parser 112 determines that the product specific data set 170 cannot be validated against the universal schema specification file 160, then, the product data set 170 is not used to install, configure, or un-install the version of the product and is not used to generate the product specific document 185.

In block 406, the installer 110 determines whether automatic installation is to occur. If so, processing continues to block 408, otherwise, processing continues to block 410. For example, if the installer 110 does not supporting automatic installation, then a user can refer to the product specific document 185 to perform manual installation.

In block 408, the installer 110 installs, configures, and/or un-installs a version of the product using the product specific data set 170 and a product specific installable 180, with minimal or zero user intervention (i.e., automatically or without human intervention). Also, the user may use the product specific document 185 to better understand automatic installation, configuration, and/or un-installation of the version of the product 130.

In block 410, a user uses the product specific document 185 to install, configure, and/or un-install a version of the product 130 manually. Thus, a user may use the product specific document 185 as a guide to manually install, configure, and/or un-install the version of the product 130. That is, the end user may manually install, configure and/or un-install the version of the product by following the instructions (e.g., steps) in the product specific document 185.

A product 130 typically includes an installer component (e.g., in the form of a wizard or user interface) to assist a user with installation of the product. However, the installer component does not determine compatibility between the product 130 to be installed and other products. This problem is solved by using the product specific data set 170, which describes the dependencies between products. The installer 110 uses the internal parser 112 to understand how to proceed with installation. In certain embodiments, the parser 112 provides the product specific document 185 to the installer 110. With embodiments, the installer 110 uses the product specific document 185 to install, configure, and/or un-install the version of the product 130 with minimal or zero user intervention.

For example, the product specific document 185 may be a PDF document that contains installation information for a specific version of a product (e.g., a specific version of a product installation on Windows™ Server 2003).

In certain embodiments, computing device 100, 140 generates a Graphical User Interface (GUI) (i.e., a JAVA™ applet or any other customized GUI) with specific product version installation, configuration, and/or un-installation details.

As an example, an Application Engine (AE) 4.0 product installation for the WINDOWS™ 2003 operating system may have the following pre-requisites:
 Application Server software–>WEBSPHERE™ software–>WEBSPHERE™ 6.1 software
 SQL Server 2005
 Process Engine software–>PE 4.0 software
 Content Engine software–>CE 4.0 software In certain embodiments, if a compatible, needed product is not available, then, the installation does not complete. For example, if the CE 4.0 software were not available, the AE 4.0 software would not be installed. In certain embodiments, an error message is issued.

For example, the installation steps may indicate:
 a) Create JAVA™ Naming and Directory Interface (JNDI) data sources in WebSphere™ Application Server (WAS).
 b) Create database for Content Engine (CE) software installation.
 c) Run Structured Query Language (SQL) scripts to create stored procedures.

JAVA is a registered trademark or common law mark of Sun Microsystems in the United States and/or other countries. If the end user is aware of how to create JNDI data sources and creating databases for the Content Engine software, then the end user does not have to look for detailed information outside of the product specific document 185.

With embodiments, if an end user would like to install a particular product version, execution of the product specific document 185 directs the end user to go through the specific steps in the installation documents (or other documents) to install a product version. With embodiments, the end user avoids going through unnecessary information, while installing the specific product version. Also, with embodiments, the end user can understand easily versions of other products are compatible with the installation, what hardware and/or software is required specific to the installation, and what pre-installation and post-installation steps are required. The end user is able to successfully install the product version at each stage. For example, the stages for installation include successful installation of pre-requisites, pre/post installation/configuration of product versions, and installation of the targeted product versions.

With embodiments, the end user is informed of the latest installation issues and solutions for the installation, configuration, and/or un-installation, and so the end user does not have to take the time to contact the product support team for a solution. With embodiments, the end user does not miss the correct sequence of installation because the product specific document 185 guides the user through the correct sequence. Also, the end user is informed of up to date information about what kind configuration should be done at different stages of installation. With embodiments, the end user makes use of installation check points (e.g., provided as verify installation steps) to make sure that installation, configuration, and/or un-installation steps are not missed.

Embodiments allow the end user to understand the installation, configuration, and/or un-installation procedure without any difficulty.

By using the product specific document 185, the end user goes through the specific steps of installation rather than looking at entire documents, this will in turn improve the product consumability on installation, configuration, and/or un-installation front.

By using the universal schema specification file 160, the installation, configuration, and/or un-installation process is improved by keeping in sync with installation processes across all the inter-related products. Hence, the end user is able to easily install any product version successfully with minimal effort.

Thus, embodiments provide a generic approach to representing installation, configuration, and un-installation data in the product specific data set 170, which is easy to maintain throughout the product life cycle for any changes and may be used efficiently by any installer component application for quick and error free installation, configuration, and un-installation.

The use of the product specific data set 170 that is unique to each product keeps the product in sync with the latest data. For example, in certain embodiments, the product specific data set 170 is updated regularly to keep in sync with the latest information related to installation, configuration, known issues, latest issues, etc. The use of the product specific data set 170 to represent data is especially useful for complex products and product suites to improve product consumability.

The product specific data set 170 may be enhanced to enable handling remote activities (e.g., installing an application on a remote application server, remote un-installations, fixpack installations and/or un-installations, product version un-installations, rollback of patch installation of a product, other rollbacks, etc). The application server may, once the remote activity is done, receive an acknowledgement to keep in sync of the completed action.

Embodiments may be used, for example, for middleware implementation, database optimization, application maintenance, and facilities hosting.

With embodiments, the product specific data set 170 may be provided to the installer 110 as input to resolve the issues in installation of the product version. For example, for a complex product version installation having multiple dependent products, the installer component may provide the minimum possible solutions, while the product specific data set 170 provides the remaining configuration/pre-installation data by maintaining the standards per the universal schema specification file. In this manner, the end user is able to resolve the issues in the installation front, and the product specific data set 170 acts as a single point of contact (i.e., combines installation and other data documents).

Thus, use of the universal schema specification file 160 and the product specific data sets 170 provide installation, configuration, and un-installation guidance. Also, the universal schema specification file 160 and the product specific data sets 170 provide verification by maintaining the product related documents, installation steps, and the latest issues in a generic manner. The universal schema specification file 160 and the product specific data sets 170 are input to a parser to easily integrate with any kind of end user environment and resolve the issues in multiple dependent product installation.

Furthermore, embodiments provide a generic way to resolve the issues in installation in case of multiple dependent product installations for any platform and for any product (e.g., products and/or platforms from different companies).

Embodiments install, configure, and un-install a version of a product automatically, with minimal or zero user intervention, using one or more product specific data sets 170 as input. Embodiments also generate the product specific document 185 that may be used during manual installation of the version of the product.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc.

Figure 7:
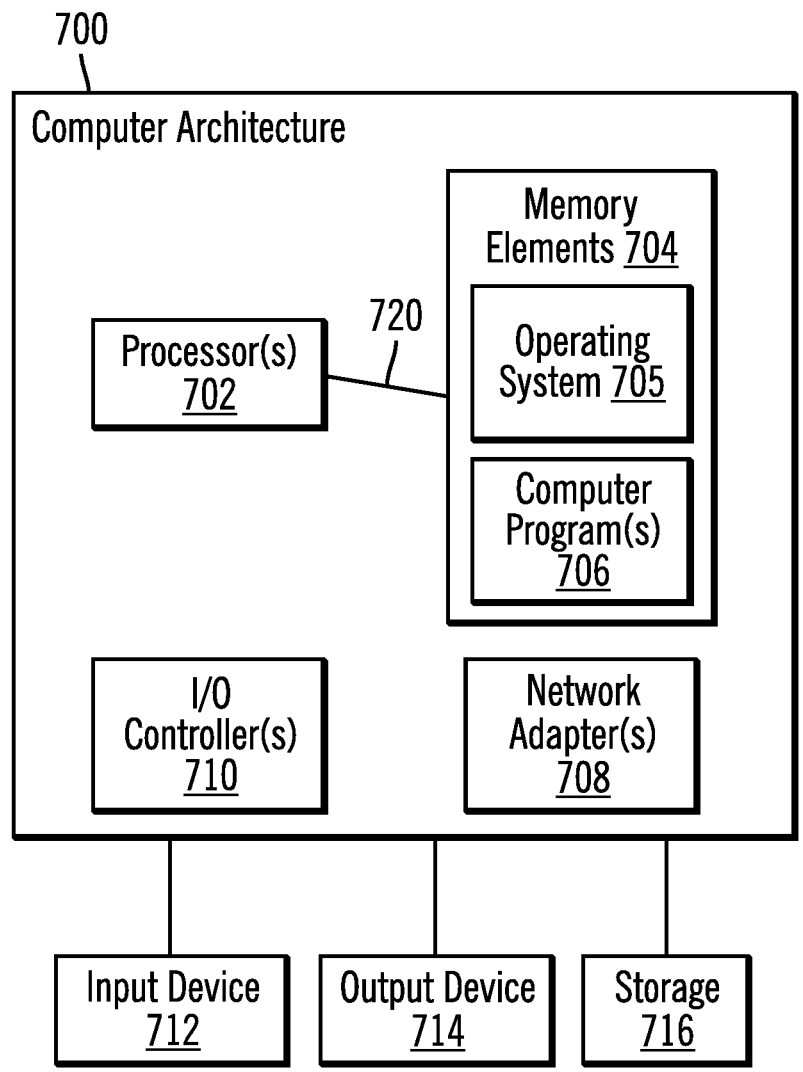
FIG. 7 illustrates a computer architecture that may be used in accordance with certain embodiments.

FIG. 7 illustrates a computer architecture 700 that may be used in accordance with certain embodiments. Computing device 100, 140, application server 200, and/or web client 290 may implement computer architecture 700. The computer architecture 700 is suitable for storing and/or executing program code and includes at least one processor 702 coupled directly or indirectly to memory elements 704 through a system bus 720. The memory elements 704 may include local memory employed during actual execution of the program code, bulk storage, and cache memories which provide temporary storage of at least some program code in order to reduce the number of times code must be retrieved from bulk storage during execution. The memory elements 704 include an operating system 705 and one or more computer programs 706.

Input/Output (I/O) devices 712, 714 (including but not limited to keyboards, displays, pointing devices, etc.) may be coupled to the system either directly or through intervening I/O controllers 710.

Network adapters 708 may also be coupled to the system to enable the data processing system to become coupled to other data processing systems or remote printers or storage devices through intervening private or public networks. Modems, cable modem and Ethernet cards are just a few of the currently available types of network adapters 708.

The computer architecture 700 may be coupled to storage 716 (e.g., a non-volatile storage area, such as magnetic disk drives, optical disk drives, a tape drive, etc.). The storage 716 may comprise an internal storage device or an attached or network accessible storage. Computer programs 706 in storage 716 may be loaded into the memory elements 704 and executed by a processor 702 in a manner known in the art.

The computer architecture 700 may include fewer components than illustrated, additional components not illustrated herein, or some combination of the components illustrated and additional components. The computer architecture 700 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

The invention claimed is:

1. A computer-implemented method, comprising:
retrieving, using a computer including a processor, a universal schema specification file that defines a structure of a product specific data set and that includes a workaround for an issue regarding installation of a version of a product;
updating the product specific data set with the workaround for the issue regarding installation of the version of the product, wherein the updated product specific data set defines a specific configuration for the version of the product;
validating the updated product specific data set using the universal schema specification file; and
using the validated product specific data set and a product specific installable to automatically install the version of the product with the specific configuration.

2. The method of claim 1, further comprising:
using the validated product specific data set to automatically configure the version of the product.

3. The method of claim 1, further comprising:
using the validated product specific data set to automatically un-install the version of the product.

4. The method of claim 1, wherein the universal schema specification file defines, for a product, a product name, a version identifier, an operating system name, supported hardware, and one or more pre-requisite software products.

5. The method of claim 4, wherein the universal schema specification file defines for product pre-configuration settings for a local installation and a remote installation with installation steps and post-configuration settings for the local installation and the remote installation, and installation verification steps.

6. The method of claim 1, wherein the universal schema specification file defines fix pack install and un-install steps.

7. The method of claim 1, wherein the universal schema specification file defines known issues and solutions.

8. The method of claim 1, further comprising:
generating a product specific document for use in manually installing, configuring, and un-installing the version of the product.

* * * * *